(12) United States Patent
Williams

(10) Patent No.: US 6,208,111 B1
(45) Date of Patent: Mar. 27, 2001

(54) MOTOR STARTER ARRANGEMENT WITH SOFT START ELECTRONIC CONTROL

(76) Inventor: Kevin R. Williams, 12920 Steepleway Blvd. #39, Houston, TX (US) 77065

( * ) Notice: Subject to any disclaimer, the term of this patent is extended or adjusted under 35 U.S.C. 154(b) by 0 days.

(21) Appl. No.: 09/175,560

(22) Filed: Oct. 20, 1998

Related U.S. Application Data

(60) Provisional application No. 60/063,199, filed on Oct. 21, 1997.

(51) Int. Cl.[7] ........................................................ H02P 1/26

(52) U.S. Cl. .......................... 318/778; 318/362; 318/445; 318/452; 318/508; 318/520; 318/767; 318/437

(58) Field of Search ...................................... 318/778, 362, 318/445, 452, 508, 520, 767, 437

(56) References Cited

U.S. PATENT DOCUMENTS 5,883,486 * 3/1999 Earhart, Jr. et al. .................. 318/778

* cited by examiner

*Primary Examiner*—Karen Masih
(74) *Attorney, Agent, or Firm*—Gary L. Bush; Mayor, Day, Caldwell & Keeton

(57) ABSTRACT

An improved motor starter assembly is provided on a frame and having an external profile which matches that or is within that of a prior motor starter is disclosed. The improved motor starter assembly provides a soft start circuit within the profile. Retrofitting of prior art motor starters is accomplished by moving the power fuses and related hardware of an existing medium voltage (2.4 Kv to 7.2 Kv) and installing the new soft start circuit on the frame of the existing motor starter. The retrofitted arrangement mounts the motor fuses horizontally and the vacuum contactors vertically in an arrangement to provide enough space within the external profile to mount the soft start circuit arrangement.

7 Claims, 5 Drawing Sheets

MOTOR STARTER ARRANGEMENT WITH SOFT START ELECTRONIC CONTROL

CROSS REFERENCE TO RELATED APPLICATION

This application claims the priority of Provisional Application Ser. No. 60/063,199 filed on Oct. 21, 1997.

BACKGROUND OF THE INVENTION

1. Field of the Invention

This invention concerns a multi-functional solid state, electrical retrofit packaging arrangement for converting any medium voltage type E-2 motor controller, existing or new build, vacuum or air-break, into a solid state soft start controller.

2. Description of the Prior Art

Pioneering research by English physicist Michael Faraday led to the discovery of electromagnetic induction in 1830. Using a ring of soft iron, Faraday wound separate coils of wire on opposite ends of the ring. He connected one of the wire coils to a battery, causing a flow of electric current through the wire coil, magnetizing the iron ring and inducing current into the second wire coil. Current flow into the second coil was controlled with a manually operated switch which opened and closed the circuit, starting and stopping the flow of current.

In 1832, Joseph Henry, an American physicist engaged in experimental work similar to Faraday's by publishing a technical paper describing his own observations in the new found physics of electromagnetic induction. Henry described experiments in which large, bright electric arcs were produced when disconnecting a current carrying electrical cable from a battery. He noted that the wire and the battery terminal (current source) caused the current to continue its flow between the two connections while being pulled apart. The same phenomenon could be observed in a device such as a manual switch. Henry referred to this electric arcing phenomenon as "self-induction".

Development of the world's first electric generators and motors evolved out of the pioneering research by Faraday and Henry. Commercial production of the first prototype electric generators began in 1850 and motors in 1870. These early machines were powered by direct current (DC). In 1888 the first successful electrical system in America utilizing alternating current (AC) was developed by Nikoli Tesla. The wide use of AC power was furthered by the scientific efforts of early electrical engineers such as George Westinghouse and Charles Steinmetz. Although DC motors and devices continue in use, AC machines are the most prominent devices of choice. From the beginning serious technical problems were encountered in the starting and stopping of AC & DC rotating electric machines.

Research and engineering in the starting and stopping of AC & DC rotating electrical machines has evolved, out of necessity, into a highly specialized area of electrical engineering. Electrical devices for opening and closing motor circuits have evolved from the simplistic manually operated air-break switches used by Faraday and Henry into highly sophisticated vacuum contactors capable of handling enormous motor horsepower loads at voltages ranging up through 15 Kv.

Until the introduction of vacuum technology about 25 years ago, variations of air-break switches, breakers, magnetic contactors and combinations of these devices in numerous configurations were the only practical devices available to start and stop AC & DC rotating electrical machines. Vacuum technology offers an alternative to air-break devices by confining the arcing phenomenon observed by Joseph Henry to the interior of a sealed vacuum container. Vacuum technology offered so many inherent advantages over the old air-break method that it quickly became the technology of choice for controlling AC & DC rotating electrical machines of all sizes. Today, vacuum contactors are the predominant devices of choice in controlling the start-stop application of medium voltage motors (2.4 Kv–15 Kv) of all types.

About 40 years ago electrical researchers began experimenting with solid state motor starting techniques. This research explored various methodologies for starting AC and DC rotating electrical machines. A solid state motor starter uses electronic circuitry in place of the traditional contactors or switches to start and stop a motor. Dependable low voltage solid state starters for small motor loads became commercially available about 20 years ago and today are available for a wide range of motor loads and higher voltages. Inherent characteristics of the solid state starter are its low starting current requirements in bringing a large motor load up to full speed and its controlled soft stop capability when taken off line. This is especially advantageous in applications involving large medium voltage motors. These types of controllers are referred to commercially as a "solid state soft start". High cost, sophisticated circuitry and technical limitations have traditionally restricted use of these devices to specialized applications. Solid state soft start controllers for large medium voltage motor applications are domestically manufactured by only a few specialty companies.

Within the solid state family of devices, controllers known as "variable speed drives" were an early product of solid state motor controller research. In addition to starting and stopping duty, these devices also have speed control capability of the rotating electrical machine(s) during normal operation and start-stop cycles. These are hybrid devices using a sophisticated combination of solid state electronics, magnetic or vacuum contactors and other components configured into a "control system". They are available from numerous foreign and domestic manufacturers for a full range of motor applications from low voltage through medium voltage. High cost and sophisticated technical nature of these systems restrict their use to highly specialized applications.

Today, there are three commonly used devices utilized for the control of a medium voltage motor: (1) vacuum controller/full voltage—"Across the Line", (2) solid state soft start, and (3) variable speed drive. A variable speed drive package is expensive and restricted to a drive oriented application requiring the specific characteristics and features offered by a drive controller. A solid state soft start has inherent characteristics which are superior to the full voltage—"across the line" vacuum contactor in controlling large medium voltage motors, but in the past were cost prohibitive.

Motor starter assemblies exist which are packaged in a roll out or drawout frame for being plugged into or unplugged from a power distribution panel. One such assembly is manufactured by the General Electric Company and is described in its brochure titled Limitamp® Medium Voltage Motor Control for motors rated between 2400–7200 volts.

One starter assembly, known as the CR7160 ampere air-break contactor, includes a motor starter assembly which is mounted on a frame and includes upper and lower disconnect plugs for each of the three leads of a power bus at its forward end. The assembly is arranged to be rolled into a power distribution panel which has a space to receive the starter assembly. At the back end of the space in the starter assembly are upper and lower plugs coupled to leads for a main power bus and for a bus to a motor. The plugs of the assembly are arranged such that when the assembly is inserted into the space of the power distribution panel, the motor starter assembly plugs mate with the plugs in the panel. The assembly includes an electrical path between the two plugs which include a fuse and a contactor.

The prior art Limitamp® motor starter assemblies include either an air-break contactor or a newer vacuum break contactor. Such contactors close the electrical path of the motor starter by control of a DC operating coil designed to be used with a holding impedance that is inserted after the contactor is fully closed to limit coil current. The contactor coil is designed for use on 120 Volts (AC) rectified or 125 Volts DC control source. A fuse is mounted in the motor starter assembly. The Limitamp® motor starter assembly can be pivoted to an open position after it is drawn out of the power distribution panel. The pivoting of the top part of the frame of the motor starter with respect to the bottom part of the frame exposes all integral parts for easy inspection and maintenance.

A great number of motor starter units of the type described above are in operation, not only in the U.S.A., but in other parts of the world as well. Such existing motor starter assemblies, while functioning well as on-off switches, cannot achieve the advantages of a soft start motor starter circuit which can apply a.c. current gradually to motor windings from a power bus until the motor reaches full speed or vice versa.

A solid state soft start circuit for connecting an a.c. motor to a high voltage power line is superior to a "full voltage— across the line" air or vacuum contactor in controlling large medium voltage motors, but in the past were cost prohibitive.

A great need exists to convert existing motor starter units of the on-off variety into modem soft-start motor starter devices, while providing such converted or improved motor starter units to be placed within the exterior profile dimensions of existing units.

IDENTIFICATION OF OBJECT OF THE INVENTION

A general object of the invention is to provide an improved motor-starter assembly having a soft start circuit which is arranged and designed with an external profile which allows it to be inserted and plugged into a power distribution panel space of predetermined dimensions.

A more specific object of the invention is to provide a retrofit arrangement of electrical parts from an existing motor starter by including a soft-start circuit which can be mounted on a frame of an existing motor starter assembly, and yet not exceed the external profile of the existing motor starter, thereby allowing the converted soft start motor starter to be inserted into a preexisting space of a power distribution panel.

SUMMARY OF THE INVENTION

The objects identified above as well as other advantages and features are embodied in an improved motor starter assembly which is packaged within the external profile of a frame and components of an existing motor starter assembly, but further includes soft start switching components. The resulting improved motor starter assembly can be moved within and plugged into the existing space of a power distribution panel.

BRIEF DESCRIPTION OF THE DRAWINGS

The objects, advantages, and features of the invention will become more apparent by reference to the drawings which are appended hereto and wherein like numerals indicate like parts and wherein an illustrative embodiment of the invention is shown, of which.

DETAILED DESCRIPTION OF THE PREFERRED EMBODIMENT OF THE INVENTION

Figure 1:
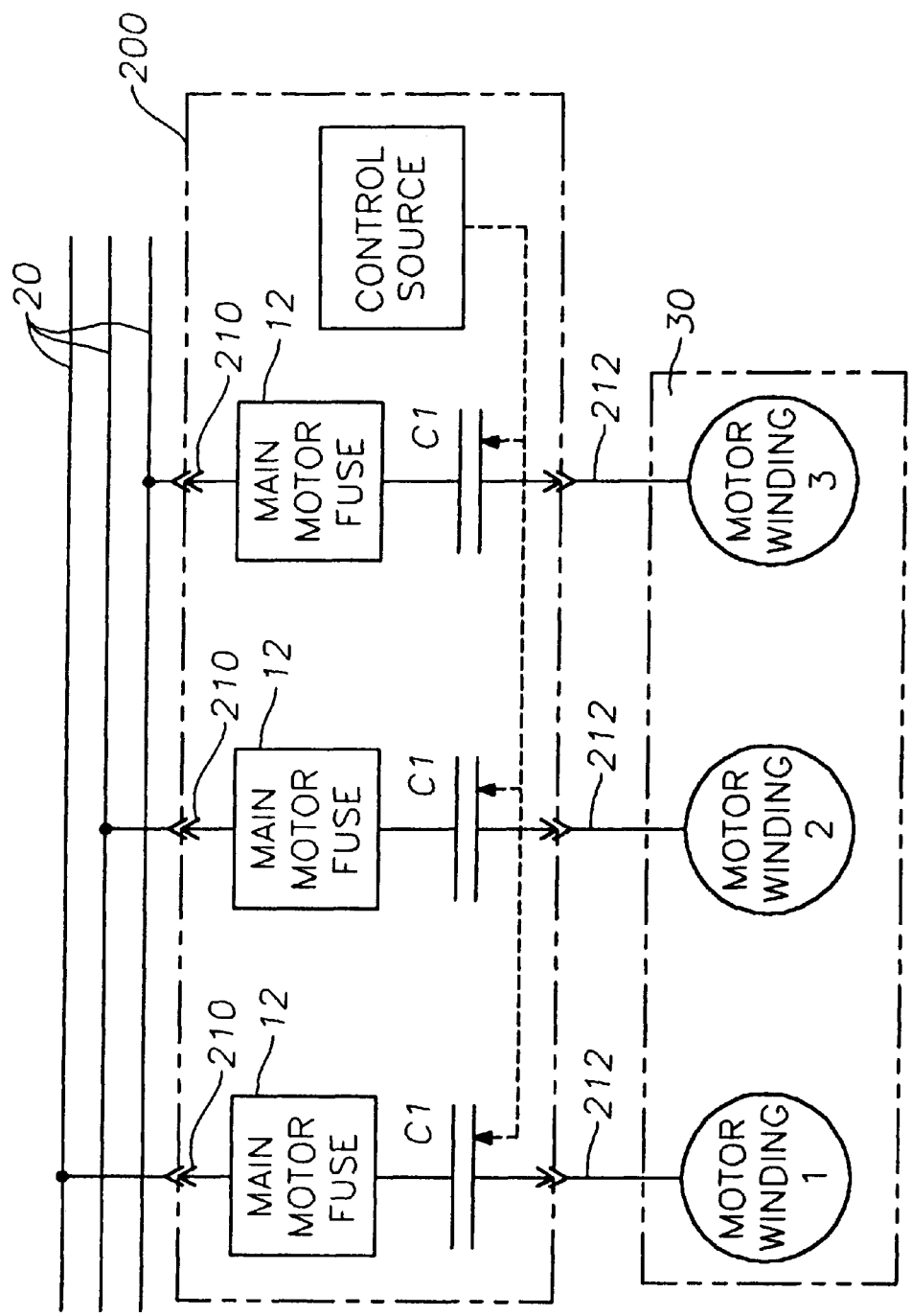
FIG. 1 is a schematic electrical circuit diagram of a prior art motor starter assembly.

FIG. 1 illustrates in a schematic electrical diagram that a starter assembly 200 is plugged into a power distribution panel for switching three phase power legs between a power bus 20 and three power leads 21 to windings of an a.c. motor 30. The circuit of the starter assembly 200 includes for each leg a main motor fuse 12 and a contactor (or switch) C1. Each fuse 12 and contactor C1 is in series with connect/ disconnect plugs 210 and 212 for plugging into a power distribution panel as illustrated in FIG. 3.

Figure 2:
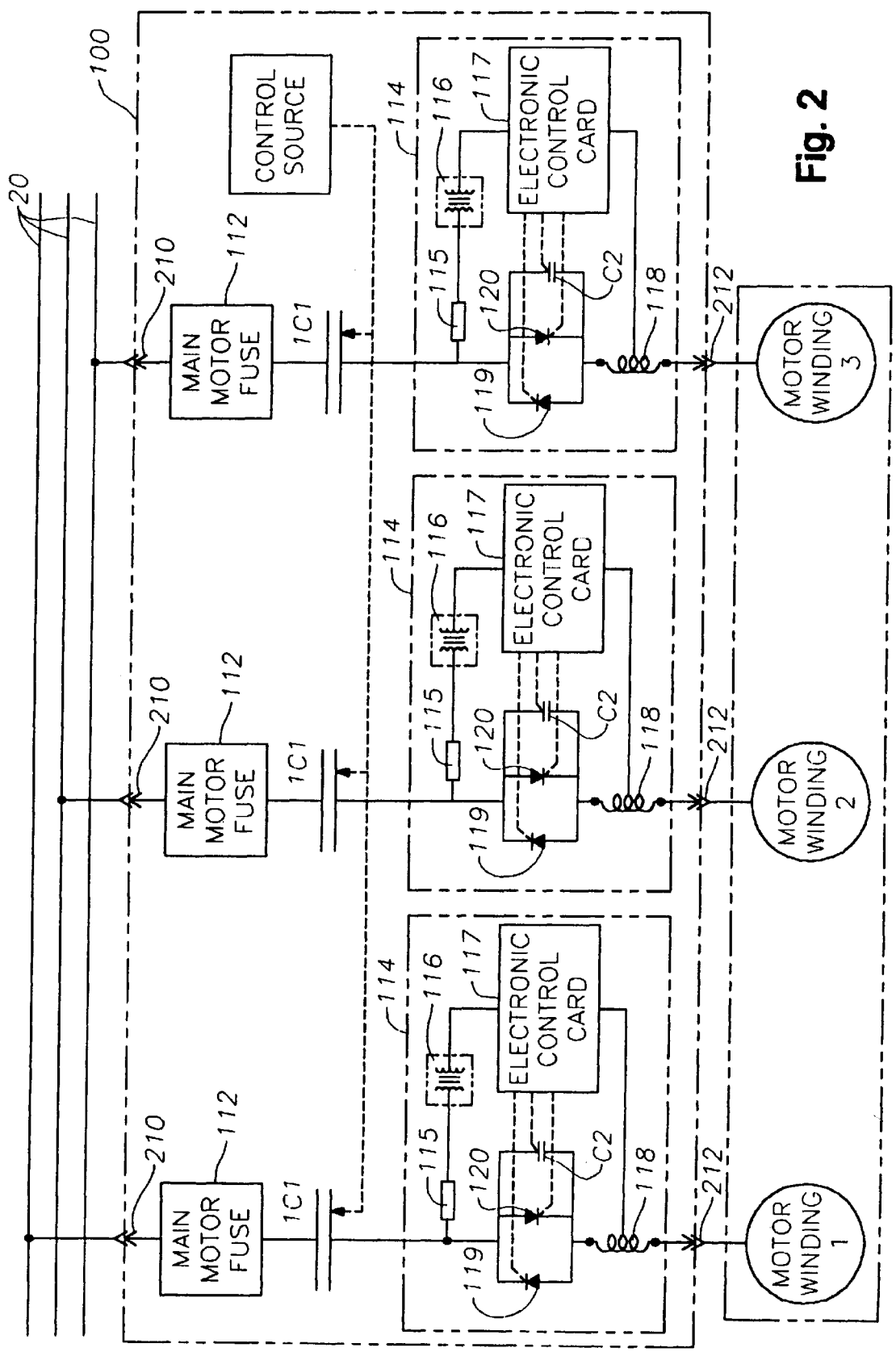
FIG. 2 is a schematic electrical circuit diagram of the improved motor starter assembly of this invention.

FIG. 2 is a schematic electrical diagram of an improved starter assembly 100 of the invention which is arranged, packaged and dimensioned to be substituted within an external profile of the prior art motor starter 200 of FIG. 1. Each leg of the motor starter 100 of FIG. 2 includes an electrical path which includes a main motor fuse 112 and an inline contactor 1C1 and a soft start circuit 114. Such soft start circuit 114 includes a fuse 115, a voltage transformer 116, a current transformer 118 and an electronic control circuit on control card 117. The control card 117 controls SCR's 119 and 120 and a bypass contactor C2, all in a conventional manner.

The electronic control card 117 controls the firing of SCR's 119, 120 and of the bypass contactor C2. (The bypass contactor is optionally closed as an improvement of the soft starter mode under operator control.)

Figure 3:
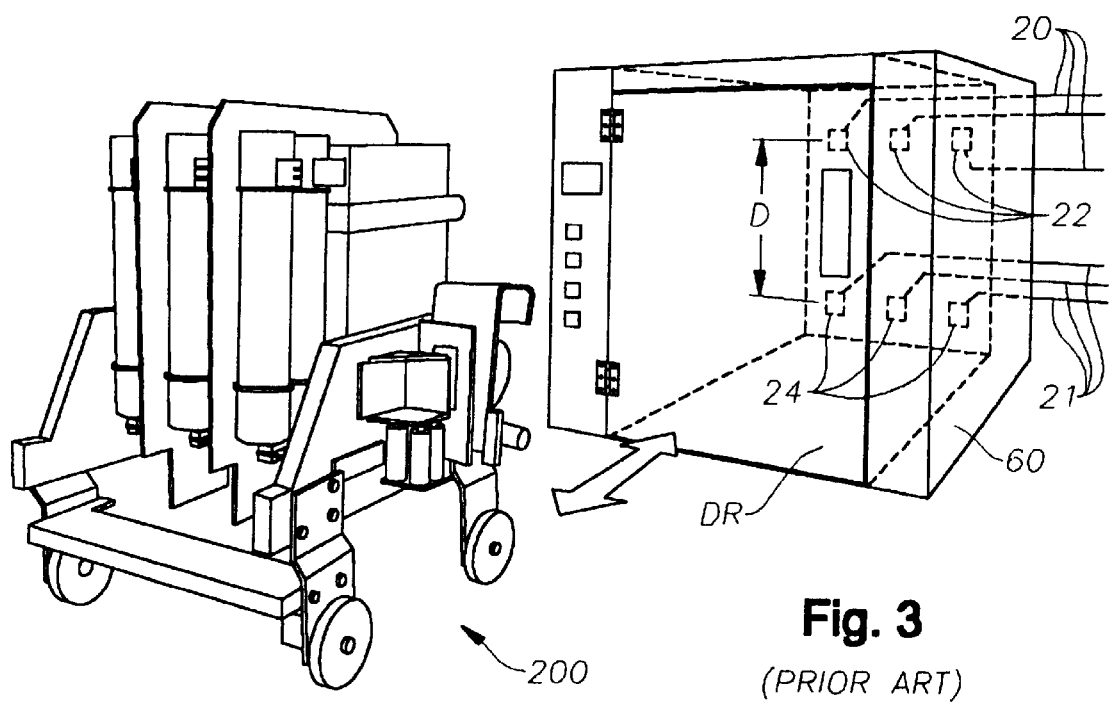
FIG. 3 illustrates a prior art power distribution panel having an opening into which a motor starter assembly may be moved in and out and removably plugged thereto.
Figure 5:
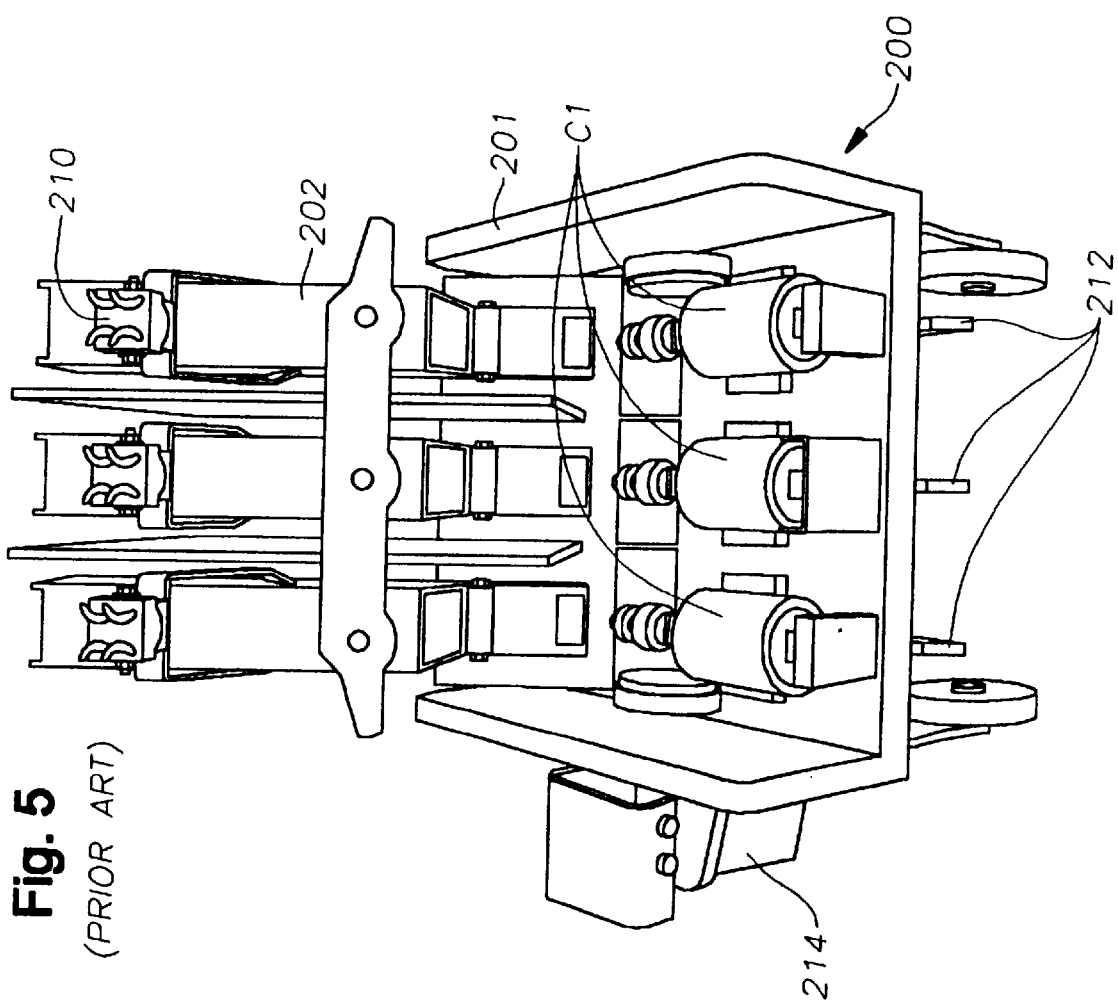
FIG. 5 is a perspective view of the front side of the prior art motor starter assembly of FIG. 4 illustrating the pivoting of a portion of the frame of the prior art motor starter assembly, the front plugs thereof and the vacuum contactors for each of the three phase leads of the circuit of FIG. 1.

FIG. 3 illustrates an enclosure 60, called a power distribution panel, in which the three legs of power bus 20 are terminated at respective plugs 22 which face outwardly on the interior back side of the enclosure. The legs of power leads 21 to windings of motor 30 are respectively terminated at plugs 24 also on the interior back side of the enclosure of power distribution panel 60. A roll-in type motor starter assembly 200 is illustrated in FIG. 3 in an unplugged outside, or "rolled out" position, but two features allow the motor starter assembly to function for being moved inside the power distribution panel for establishing a switched electrical path between power leads 20 and motor winding leads 21. The first is that top and bottom disconnect plugs on the front side of the motor starter 200 (not visible in FIG. 3, but see FIGS. 5 and 6) are positioned to register with corresponding plugs 22 and 24 on the interior back side of the panel 60 when the motor starter assembly is moved into the plugged position inside the panel. The other feature is that the exterior profile of the motor starter 200 is dimensioned so that it can fit in the predetermined width and height dimension of door DR of panel 60 and have a depth dimension that allows it to be plugged into plugs 22, 24 with the capability to close door DR on panel 60.

Figure 4:
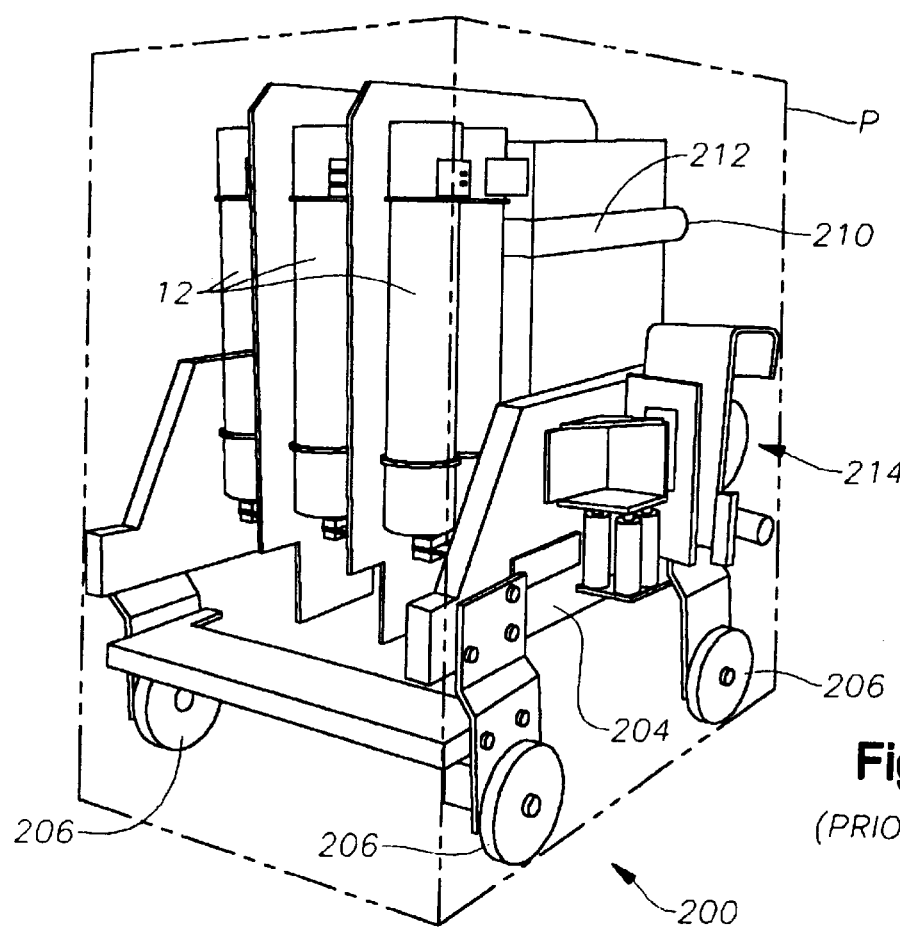
FIG. 4 is a perspective view of the back side of the prior art motor starter assembly of FIG. 4 illustrating the physical placement of the main motor fuses of the electrical circuit of FIG. 1.

FIG. 4 shows a more detailed perspective view of the motor starter 200 which includes a frame 204 mounted on wheels 206. Top plugs 210 (only partially visible in FIG. 4) are each electrically connected to main fuses 12 by a conducting strip 212. The motor starter assembly 200 is characterized by an external profile defined by width, depth and height dimensions which allow it to be moved into the power distribution panel 60 through door DR while having its electrical plugs being dimensioned to register with plugs 22, 24 of the panel 60. Also shown in FIG. 4 is the prior art mechanism 214 for operating contactor C1 and for insuring that such contactors are open prior to unplugging and rolling out the motor starter 200 from the power distribution panel 60. At this point, it should be emphasized that the invention is not limited to a roll out motor starter/power distribution panel arrangement, but includes any motor starter unit which can be unplugged and moved out of the power distribution panel, for example by sliding or even lifting the motor starter out of the panel arrangement for maintenance, and of course, vice versa for reinstalling the motor starter into the panel.

FIG. 5 again illustrates in a front perspective view, the prior art motor starter assembly 200 including vacuum contactors C1 positioned horizontally in lower frame member 201. Top plugs 210 are carried in top frame member 202 which is pivotable (shown in an up pivoted orientation). Bottom plugs 212 are positioned on the bottom of the frame.

Figure 6:
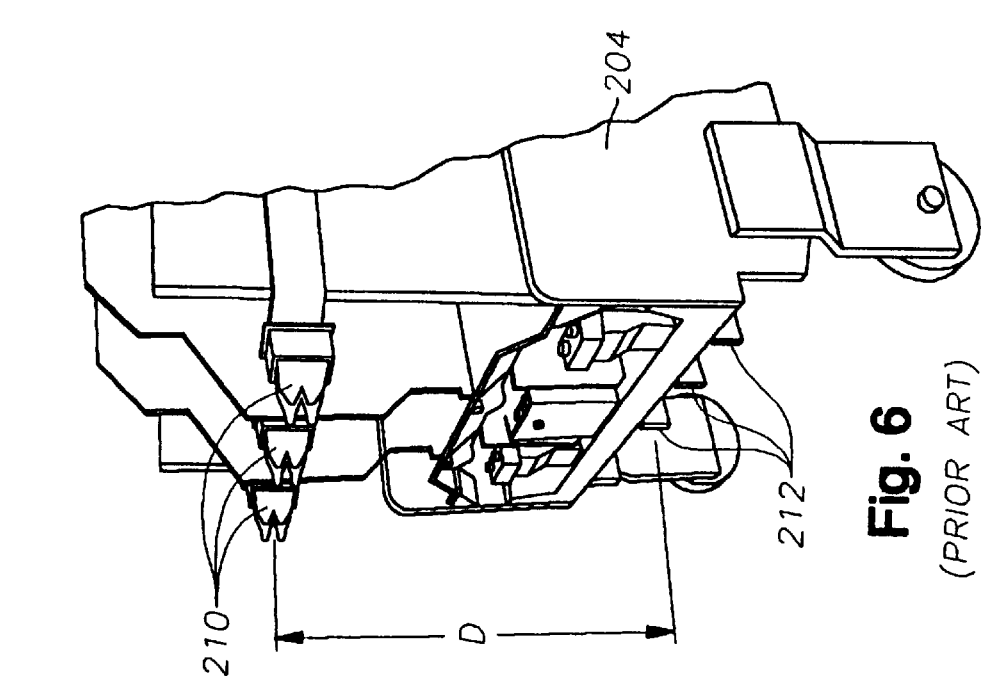
FIG. 6 is a perspective view, partially cut away, of the front side of the prior art motor starter assembly of FIG. 4 with a portion of the frame of the prior art motor starter assembly in a down position and further showing the connect/disconnect plugs of the front of the assembly.

FIG. 6 shows the top frame portion of the prior art motor starter 200 in a pivoted down position with the top plugs 210 and the bottom plugs 212 illustrated. Such top plugs 210 and bottom plugs are separated by a distance D to register with plugs 22, 24 of the panel (see FIG. 3).

Figure 7:
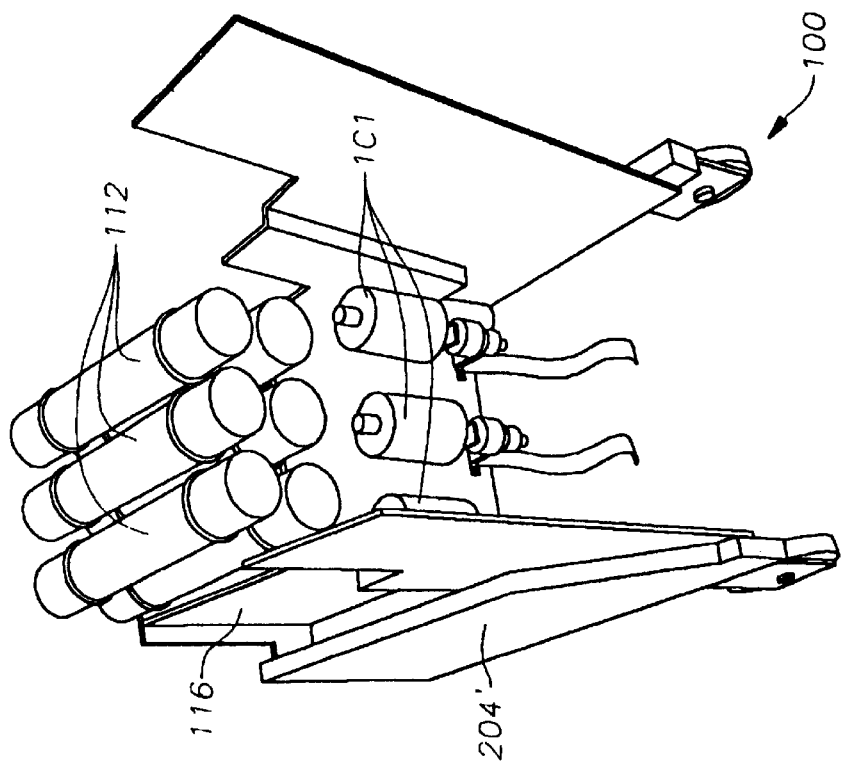
FIG. 7 is a partial view of a portion of the improved motor starter assembly of the invention showing motor fuses for each of the three phase leads carried horizontally on the top portion of the frame.

FIG. 7 shows a rear view of the improved motor starter unit 100 in which all the electrical components of FIG. 2 are packaged so as to be the same as or within the external profile P of the prior art motor starter 200 of FIGS. 3, 4, 5 and 6. In other words, the frame 204' of the improved motor starter 100 is substantially the same as that of prior art motor starter 200, and the plugs 210, 212 are mounted on the front face thereof in the same way as shown in FIG. 6. Thus, the improved motor starter 100 of FIGS. 2, 6 and 7 may be substituted in power distribution panel 60 of FIG. 3 for that of motor starter 200, with the result that a soft start motor starter can be substituted in panel 60 for the prior art vacuum contactor or air contactor motor starter 200.

Figure 8:
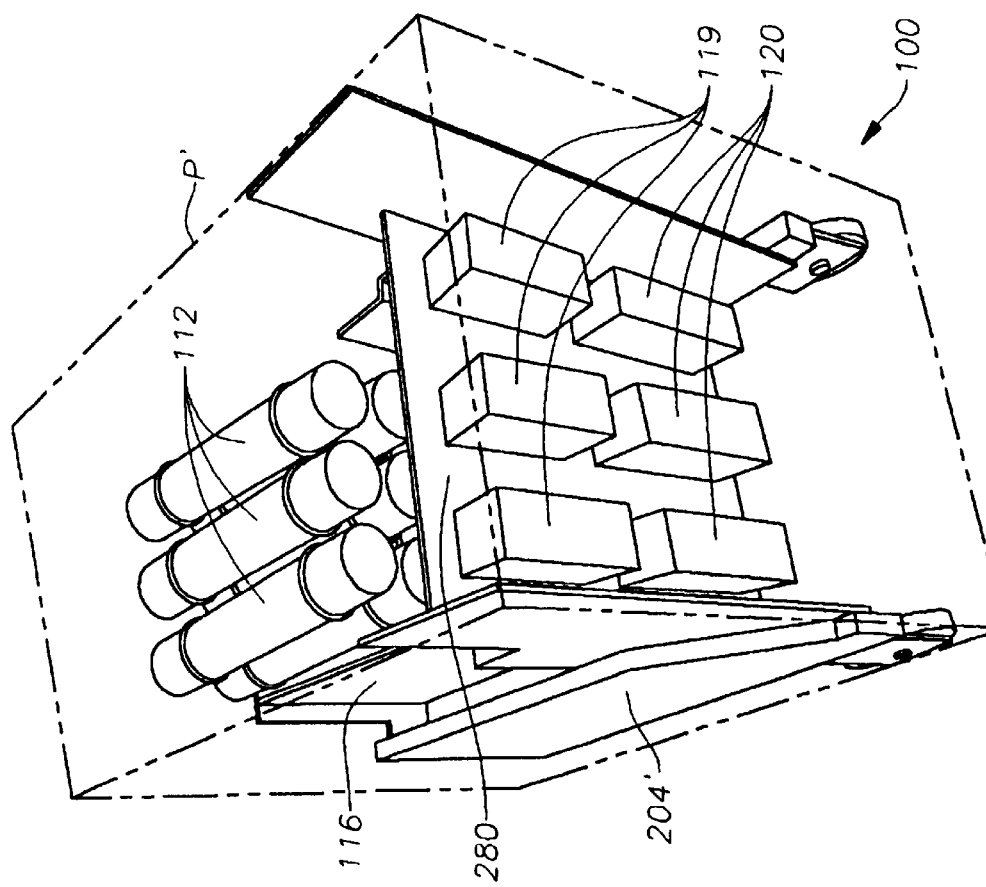
FIG. 8 is a rear perspective view of the improved motor starter assembly of this invention which incorporates the circuit of FIG. 2 within the exterior profile of the prior art motor starter assembly of FIG. 4.

FIG. 7 illustrates that motor fuses 112 are mounted horizontally across the top of frame extension 116 and that in-line contactors 1C1 are mounted vertically thereon. Rearrangement of the fuses 112 and the contactors as illustrated is essential in order to provide enough room at the rear of the frame to mount the soft start circuits 114. Frame 116 may be pivotable like the frame 202 of prior art motor starter 200 (FIG. 5) or it may be stationary. As illustrated in FIG. 8, the SCR's 119, 120 are mounted on a panel 280 to the rear of frame 116. As illustrated, the external profile P' of the improved motor starter 100 is entirely the same as or within that of profile P of the prior motor starter 200 and can be substituted therefor in all respects, with the improvement of a soft start motor starter assembly.

The present invention and the best modes of practicing it have been described. It is to be understood that the foregoing descriptions are illustrative only and that other means and techniques can be employed without departing from the fill scope of the invention as described in the appended claims.

What is claimed is:

1. An improved motor starter assembly which includes a frame which can be moved inwardly into a plugged state into a predefined dimensioned space through a predefined dimensioned opening of a power distribution panel or moved outwardly to an unplugged state from said predefined space of said power distribution panel, said assembly having a first plug and a second plug which are separated by a predetermined distance so that when said starter assembly is moved into said predefined space of said panel in said plugged relation, said first plug mates with a power bus plug within said power distribution panel and said second plug mates with a motor bus plug within said power distribution panel, said motor starter assembly having electrical components mounted on said frame and connected in an electrical path between said first plug and said second plug which includes a fuse and a switch, said frame and electrical components being mounted within a space defined by a predetermined external profile having height, width, and depth dimensions which allow said motor starter assembly to be moved into said predefined dimensioned space through said predefined dimensional opening and into said predimensioned space of said power distribution panel, comprising a soft start motor starter circuit arrangement connected in said electrical path having electrical components which are mounted within said predetermined external profile.

2. The improved motor starter assembly of claim 1 wherein, said switch is an air type contactor.

3. The improved motor starter assembly of claim 1 wherein, said switch is a vacuum contactor.

4. The improvement of claim 1 wherein, said frame includes rollers mounted on said frame which are arranged and designed for the frame to be rolled into our out of said space of said power distribution panel.

5. The improved motor starter assembly of claim 3 wherein said soft start motor circuit arrangement includes solid state switches controlled by signals from an electronic control circuit.

6. The improved motor starter assembly of claim 5 further comprising, a bypass vacuum contactor which is placed in parallel with said solid state switches.

7. The improved motor starter assembly of claim 1 wherein, said fuse is mounted horizontally on said frame and said switch is mounted vertically on said frame, and said soft start motor starter circuit arrangement is mounted to the rear of said fuse and switch.

* * * * *